US008732742B2

(12) United States Patent
Whitley

(10) Patent No.: US 8,732,742 B2
(45) Date of Patent: May 20, 2014

(54) APPARATUS, SYSTEMS AND METHODS FOR CUSTOMER PREMISES WEATHER REPORTING AT A MEDIA DEVICE

(75) Inventor: Samuel Whitley, Cheyenne, WY (US)

(73) Assignee: EchoStar Technologies L.L.C., Englewood, CO (US)

( * ) Notice: Subject to any disclaimer, the term of this patent is extended or adjusted under 35 U.S.C. 154(b) by 383 days.

(21) Appl. No.: 12/916,217

(22) Filed: Oct. 29, 2010

(65) Prior Publication Data

US 2012/0110614 A1 May 3, 2012

(51) Int. Cl.
*H04N 7/10* (2006.01)

(52) U.S. Cl.
USPC ........................................................... 725/32

(58) Field of Classification Search
None
See application file for complete search history.

(56) References Cited

U.S. PATENT DOCUMENTS

| | | | | |
|---|---|---|---|---|
| 2006/0064726 | A1* | 3/2006 | Loner | 725/68 |
| 2006/0123053 | A1 | 6/2006 | Scannell, Jr. | |
| 2007/0112939 | A1 | 5/2007 | Wilson et al. | |
| 2007/0192486 | A1 | 8/2007 | Wilson et al. | |
| 2010/0138057 | A1* | 6/2010 | Curtin et al. | 700/286 |
| 2010/0238179 | A1* | 9/2010 | Kelly | 345/473 |

* cited by examiner

*Primary Examiner* — Brian T Pendleton
*Assistant Examiner* — Jean D Saint Cyr
(74) *Attorney, Agent, or Firm* — Lowe Graham Jones PLLC

(57) ABSTRACT

Customer premises weather station systems and methods are operable to present local weather information on a media presentation system display located at the customer premises. An exemplary embodiment detects at least one ambient weather condition using a detector located at a customer premises, determines occurrence of a degradation of at least one characteristic of an over the air (OTA) media content signal received by a receiving antenna located at the customer premises, and generates a report in response to the determined degradation of the OTA media content signal characteristic. The report is configured to be presented on a display to a customer. The report may indicate the at least one ambient weather condition.

16 Claims, 2 Drawing Sheets

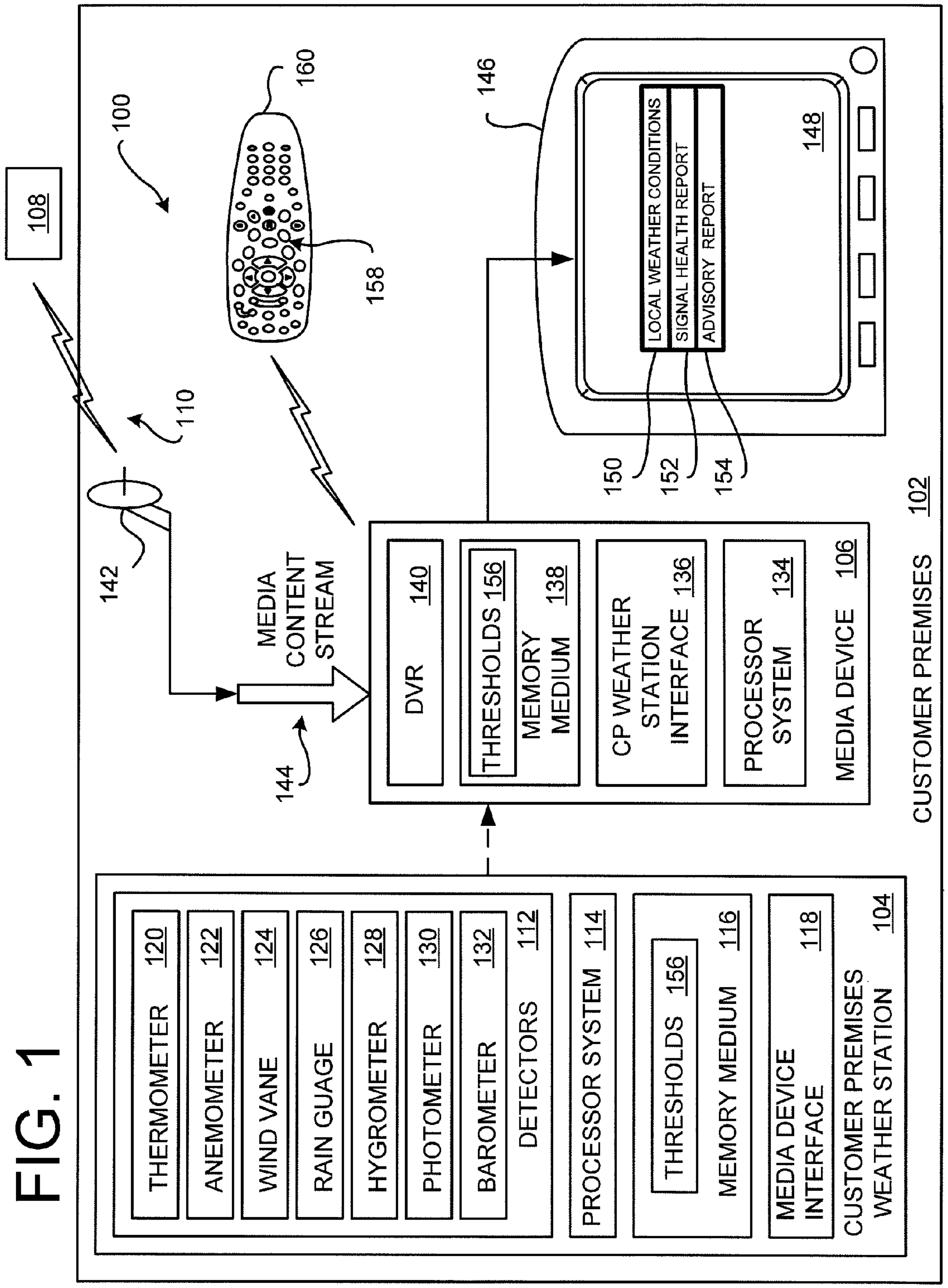
FIG. 1
100
108
110
142
MEDIA CONTENT STREAM
144
160
158
146
LOCAL WEATHER CONDITIONS
SIGNAL HEALTH REPORT
ADVISORY REPORT
148
150
152
154
DVR 140
THRESHOLDS 156
MEMORY MEDIUM 138
CP WEATHER STATION INTERFACE 136
PROCESSOR SYSTEM 134
MEDIA DEVICE 106
CUSTOMER PREMISES 102
THERMOMETER 120
ANEMOMETER 122
WIND VANE 124
RAIN GUAGE 126
HYGROMETER 128
PHOTOMETER 130
BAROMETER 132
DETECTORS 112
PROCESSOR SYSTEM 114
THRESHOLDS 156
MEMORY MEDIUM 116
MEDIA DEVICE INTERFACE 118
CUSTOMER PREMISES WEATHER STATION 104

APPARATUS, SYSTEMS AND METHODS FOR CUSTOMER PREMISES WEATHER REPORTING AT A MEDIA DEVICE

BACKGROUND

Media devices may be configured to receive media content by receiving over the air (OTA) media content signals. An exemplary media device includes a set top box (STB) that is configured to receive a satellite signal. Another example is a television that is configured to receive local broadcast station television signals. Yet another example is a computer, cell phone, tablet PC, or other electronic consumer device that is configured to receive media content over a cellular system, a WiFi system, or other over the air type network.

At times, local weather at the customer premises may potentially interfere with reception of the OTA media content signal. However, the customer of the media device may not appreciate that local weather conditions are interfering with reception of the OTA media content signal. When poor signal reception interferes with the quality of the presented media content, the customer may call into a service center, a call center, or the like operated by the media service provider to inquire about the reason that their media device is not receiving, or is receiving with poor quality, the OTA media content signal. If the media customer service representative responding to the customer's service inquiry is unaware of the local weather conditions, trouble shooting the customer's device to determine the source of the reception problem may be relatively difficult. Accordingly, there is a need in the arts to provide improved information to ascertain the nature of OTA reception problems.

SUMMARY

Systems and methods of presenting local weather information on a media presentation system display located at the customer premises are disclosed. An exemplary embodiment detects at least one ambient weather condition using a detector located at a customer premises, determines occurrence of a degradation of at least one characteristic of an over the air (OTA) media content signal received by a receiving antenna located at the customer premises, and generates a report in response to the determined degradation of the OTA media content signal characteristic. The report is configured to be presented on a display to a customer. The report may indicate the at least one ambient weather condition.

BRIEF DESCRIPTION OF THE DRAWINGS

Preferred and alternative embodiments are described in detail below with reference to the following drawings:

FIG. 1 is a block diagram of an embodiment of a customer premises weather monitoring system.

DETAILED DESCRIPTION

Figure 2:
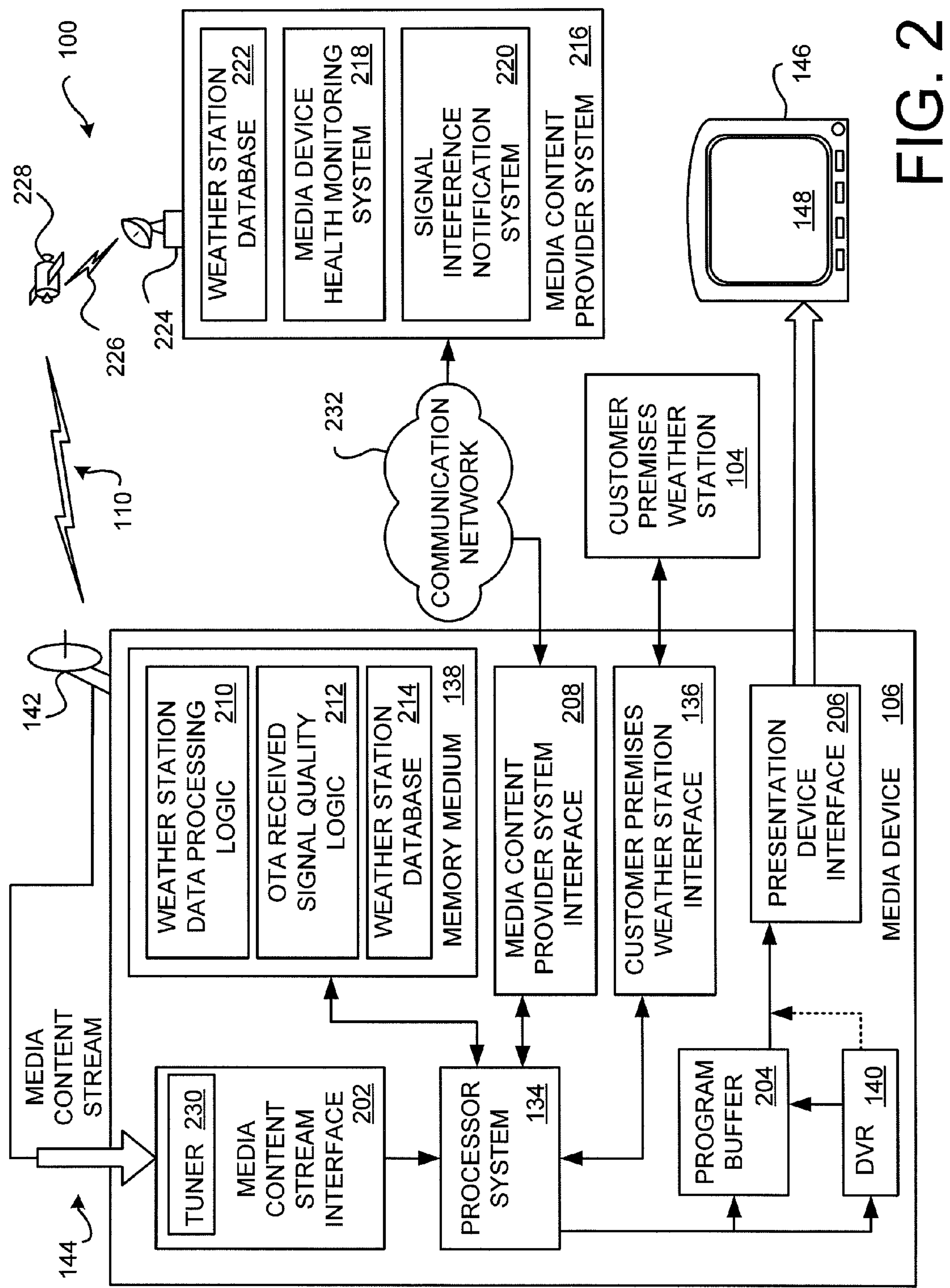
FIG. 2 is a block diagram of an embodiment of the customer premises weather monitoring system implemented in a set top box.

FIG. 1 is a block diagram of an embodiment of a customer premises weather monitoring system 100 located at a customer premises 102. Exemplary embodiments of the customer premises weather monitoring system 100 comprise a customer premises weather station 104 and at least one media device 106. Exemplary media devices 106 include, but are not limited to, a set top box (STB), a radio, a television (TV), a personal computer (PC), a hand-held device, a cellular phone, and other electronic devices that are configured to receive, from a broadcasting source 108, one or more over the air (OTA) media content signals 110. Exemplary customer premises 102 include, but are not limited to, a residence, a place of business, or a vehicle such as a recreational vehicle (RV), trailer, or boat.

In some situations, signal degradation of the received OTA media content signal 110 may occur due to adverse weather conditions. Embodiments of the customer premises weather monitoring system 100 are configured to monitor ambient weather conditions and provide notification when the adverse weather conditions are likely causing a degradation in the received OTA media content signal 110. Signal degradation may be identified by a decrease in the received signal strength, a loss of signal lock, image pixelization, or other signal characteristic changes that indicate a reduction in the quality of the received OTA media content signal 110.

The customer premises weather station 104 comprises a plurality of ambient weather condition detectors 112, an optional processor system 114, an optional memory medium 116, and a media device interface 118. The detectors 112 are configured to detect characteristics of ambient weather conditions at the customer premises 102. Information provided by one or more of the detectors 112 is presented to the customer. Information corresponding characteristics of the OTA media content signal 110 may also be presented to the customer. Accordingly, the customer appreciates the effect of the weather on reception of the OTA media content signal 110. Some embodiments are configured to communicate information from the detectors 112 and/or the characteristics of the received OTA media content signal 110 to a remote facility, such as a service center, a call center, or the like operated by the media service provider. Thus, if the customer contacts the media service provider to inquire about the reason that their media device in not receiving, or is receiving with poor quality, the OTA media content signal 110, local weather information is available to the customer service representative who is helping the customer.

Exemplary detectors 112 may include, but are not limited to, one or more of a thermometer 120 or another electronic device configured to measure ambient temperature, an anemometer 122 or another electronic device configured to measure wind speed, a wind vane 124 or another electronic device configured to measure wind movement direction, a rain gauge 126 or another electronic device configured to measure precipitation, a hygrometer 128 or another electronic device configured to measure humidity, a photometer 130 or another electronic device configured to measure ambient light intensity, a barometer 132 or another electronic device configured to measure relative air pressure. Alternative embodiments of the customer premises weather station 104 may include fewer of the above-described components, and/or may include other detectors and/or components not described herein.

The exemplary media device 106 comprises a processor system 134, a customer premises (CP) weather station interface 136, a memory medium 138, and an optional digital video recorder (DVR) 140 or other media recording device. The media device 106 is coupled to, or has incorporated therein, a receiving antenna 142. The receiving antenna 142 is configured to receive the OTA media content signal 110 that has one or more media content streams 144 therein. In the various embodiments, the processor system 134 monitors various signal characteristics of the received OTA media content signal 110.

The CP weather station interface 136 of the media device 106 is configured to communicatively couple with the media device interface 118 of the customer premises weather station 104. Accordingly, information from the detectors 112 may be communicated from the customer premises weather station 104 to the media device 106. However, optional signal conditioning components may be employed to enhance signal quality and/or signal format of the weather information communicated from the detectors 112.

In some embodiments, the media device interface 118 and the CP weather station interface 136 are configured to couple to one or more wire connectors. In an exemplary embodiment, the detectors 112 are coupled to the media device interface 118 using a hard wire connection. Accordingly, output from the detectors 112 may be directly transmitted to the CP weather station interface 136.

In alternative embodiments, the media device interface 118 and the CP weather station interface 136 are components of a radio frequency (RF) system. In such embodiments, the processor system 114 is configured to convert information provided by the detectors 112 into information that may be wirelessly transmitted from the customer premises weather station 104 to the media device 106. Accordingly, the media device interface 118 and the CP weather station interface 136 include RF transceivers and related components.

In an exemplary embodiment, the ambient weather information from the detectors 112 is stored in the memory medium 138 of the media device 106. Alternatively, or additionally, the ambient weather information from the detectors 112 may be stored in the optional memory medium 116 of the customer premises weather station 104. The ambient weather information may be stored continuously on a real time basis, may be stored periodically, and/or may be stored on an exception basis when one or more of the detected weather conditions exceeds a threshold 156 corresponding to the weather condition.

The media device 106 is illustrated as being communicatively coupled to a television (TV) 146. The video portion of the received media content is presented on a display 148 of the TV 146. The media device 106 may be coupled to other types of media presentation devices, such as but not limited to radios, personal computers, hand-held devices, cellular phones, and other electronic devices that are configured to present the media content. The media device 106 may be communicatively coupled to the presentation device via a suitable wire connector, and/or may be communicatively coupled to the media presentation device using a suitable wireless medium, such as a RF or infrared medium. Further, the media device 106 may be coupled to other media devices and/or to multiple media presentation devices (not shown).

Embodiments of the customer premises weather monitoring system 100 are configured to generate information pertaining to the detected local ambient weather conditions for presentation to a customer. A local weather conditions report 150 is generated and communicated to the media presentation device for presentation, such as on the display 148 of the TV 146. Additionally, or alternatively, a signal health report 152 and/or an advisory report 154 may be generated and communicated to the media presentation device 106 for presentation.

In an exemplary embodiment, the local weather conditions report 150, the signal health report 152, and/or the advisory report 154 may be automatically generated and communicated to the media presentation device for presentation. For example, one or more of the detected weather conditions may be continuously monitored, or periodically monitored, by the customer premises weather monitoring system 100. Detected weather conditions may be compared with a corresponding weather condition threshold 156. In the event that the detected weather condition exceeds its corresponding threshold 156, one or more of the reports 150, 152 and/or 154 are then generated and communicated to the media presentation device for presentation.

In some embodiments, the weather condition thresholds 156 may be predefined by the media service provider. For example, but not limited to, a known weather threshold 156 may correlate to anticipated degraded reception of the OTA media content signal 110. Accordingly, automatic presentation of one or more of the reports 150, 152 and/or 154 will notify the customer of a potential problem in receiving the OTA media content signal 110.

In some embodiments, the weather condition thresholds 156 may be defined by the customer. The customer may appreciate that a coming storm may degrade signal reception in the near future. Accordingly, the customer may plan on implementing a remedial action, such as by knocking snow off of the receiving antenna 142, if one or more of the reports 150, 152 and/or 154 are presented. Alternatively, or additionally, the customer may choose to watch media content from an alternative source, such as the digital video recorder DVR 140 or another media device, such a digital video recorder (DVR) device (not shown).

In some situations, the customer may want to be notified of a weather condition of interest. For example, the customer may wish to be notified of freezing weather or an impending storm so that they may protect their outdoor plants. The customer may define a weather condition threshold 156 to correspond to an ambient temperature that is at or near the freezing temperature of water.

In such embodiments, the customer may define a weather condition threshold 156 of interest in a variety of ways. For example, but not limited to, the customer may actuate one or more of the controllers 158 on their remote control 160 to cause presentation of a graphical user interface (GUI) menu. The customer may navigate about or scroll through the GUI menu to specify one or more weather condition thresholds 156 of interest.

Further, multiple weather condition thresholds 156 may be used to generate selected ones of the reports 150, 152 and/or 154 for various weather conditions. For example, the weather conditions report 150 may be generated when one or more of the detected weather conditions exceeds a customer defined threshold 156. In contrast, the signal health report 152 and/or the advisory report 154 may be generated when one or more of the detected weather conditions exceeds a predefined threshold 156 associated with signal reception degradation.

The weather conditions report 150 may present any information of interest to the customer. An exemplary local weather conditions report 150 presents information pertaining to selected local ambient weather conditions of interest, such as temperature, wind speed and direction, precipitation amounts and/or type, barometric pressure, or the like. The weather conditions report 150 may be presented using a predefined report format. Alternatively, or additionally, the customer may select which of the local weather conditions are reported. Alternatively, or additionally, the local weather conditions report 150 may present local weather conditions that exceed a corresponding weather condition threshold 156. Further, local weather conditions exceeding a weather condition threshold 156 may be highlighted or otherwise emphasized to increase customer awareness.

Embodiments of the customer premises weather monitoring system 100 are further configured to compare characteristics of the received OTA media content signal 110 with thresholds 156 associated with OTA media content signal characteristics. When one or more of the characteristics of the received OTA media content signal 110 violates a signal characteristic threshold 156, one or more of the reports 150, 152, and/or 154 may be generated. For example, signal strength of the received OTA media content signal 110 may be less than a signal strength threshold 156. As another example, a level of pixelization of image generated from the received OTA media content signal 110 may exceed a pixelization threshold 156.

The signal health report 152 may indicate any suitable information pertaining to characteristics of the received OTA media content signal 110. For example, the signal health report 152 may present an indicia corresponding to a strength of the received OTA media content signal 110. Further, the value of the signal characteristic threshold 156 may be optionally indicated on the signal health report 152 so that the customer appreciates the extent of the degradation. Alternatively, or additionally, the indicia may indicate a percentage of signal strength, loss of signal lock, pixelization, or other signal characteristics. Other information pertaining to the signal strength may be additionally, or alternatively, included in the signal health report 152. For example, but not limited to, data lost or dropped may be reported to the customer who may be using a computer or the like.

In some embodiments, an advisory report 154 is automatically generated when one or more local weather conditions exceed a corresponding weather condition threshold 156. The advisory report may be a simplified report that indicates that the OTA media content signal 110 may not be reliably received due to local weather conditions.

The reports 150, 152 and/or 154 may present textual information and/or graphical information. For example, severe precipitation may be indicated using images such as "rain drops" or the like.

Further, the reports 150, 152 and/or 154 may include other information of interest. For example, a date and/or a time of day associated with the detected weather information may be included on the reports 150, 152 and/or 154.

Additionally, or alternatively, weather information from other sources may be included in the reports 150, 152 and/or 154. Local weather information provided by a weather service facility or a local programming station may be retrieved and included in the reports 150, 152 and/or 154. For example, a temperature recorded at an airport may be received from a weather service facility or a local programming station and incorporated into the reports 150, 152 and/or 154. Accordingly, the customer can appreciate a temperature difference between their particular location and the temperature detected at the airport.

When the reports 150, 152 and/or 154 are generated and presented, the current presentation of media content may be managed in a variety of manners. In an exemplary embodiment, presentation of the media content may be paused and replaced by the presented reports 150, 152 and/or 154. Alternatively, or additionally, the presented reports 150, 152 and/or 154 may be overlaid on top of the presented media content, with continued presentation of the media content or with a pause in presentation of the media content. Alternatively, or additionally, the reports 150, 152 and/or 154 may be presented with some degree of transparency (i.e.: a watermark format) so as to permit continued viewing of the presented media content.

In an exemplary embodiment that includes the processor system 114 and the memory medium 116 in the customer premises weather station 104, processing of detected weather information by the detectors 112 may be managed at the customer premises weather station 104. The weather information may be optionally stored in the memory medium 116. The processed local ambient weather information may be formatted into a suitable format that is used by the media device 106. For example, detector output from the thermometer 120 may be processed into a Fahrenheit degree or a Celsius degree value.

The processed local ambient weather information may be communicated at various times, under various conditions, and in varying amounts. For example, the processed local ambient weather information may be communicated from the customer premises weather station 104 to the media device 106 continuously or periodically. Alternatively, or additionally, the processed local ambient weather information may be communicated on an exception basis, such as when one or more of the detected ambient weather conditions exceeds a weather condition threshold 156.

In some embodiments, the processed local ambient weather information may be communicated in response to a query or request received from the media device 106. In some embodiments, the request may be automatically generated by the media device 106. Alternatively, or additionally, the request may be generated in response to a request initiated by the customer. For example, the customer may actuate one or more of the controllers 158 on their remote control 160 to cause presentation of a GUI menu, whereby the customer initiates a customer request for presentation of one of the reports 150, 152 and/or 154.

FIG. 2 is a block diagram of an embodiment of the customer premises weather monitoring system 100 implemented in media device 106 that is a set top box (STB). The media device 106 is configured to receive the media content stream 144 via an over the air satellite signal 110.

The non-limiting exemplary media device 106 comprises the processor system 134, the optional digital video recorder (DVR) 140, the customer premises weather station interface 136, the memory medium 138, a media content stream interface 202, a program buffer 204, a presentation device interface 206, and an optional media content provider interface 208. The memory medium 138 comprises portions for storing the weather station data processing logic 210, over the air (OTA) received signal quality logic 212, and an optional weather station database 214. In some embodiments, the weather station data processing logic 210 and the OTA received signal quality logic 212 may be integrated together, and/or may be integrated with other logic. Other media devices may include some, or may omit some, of the above-described media processing components. Further, additional components not described herein may be included in alternative embodiments.

The functionality of the media device 106, here a set top box, is now broadly described. A media content provider provides program content to their customers via a media content provider system 216. In the illustrated embodiment, the media content provider system 216 comprises a media device health monitoring system 218, a signal interference notification system 220, and an optional weather station database 222.

In the illustrated embodiment, a ground station antenna 224 uplinks a plurality of transport channels 226 to one or more satellites 228. The satellite 228 transmits one or more of the OTA media content signals 110 to a geographic region where the customer premises 102 are located. The OTA media content signal 110 is received by the receiving antenna 142. The received OTA media content signal 110 comprises one or more media content streams 144 to the media content stream interface 202.

One or more tuners 230 in the media content stream interface 202 selectively tune to one of the media content streams 144 in accordance with instructions received from the processor system 134. The processor system 134, based upon a request for a program of interest specified by the customer, parses out program content associated with the program of interest. The program of interest is then assembled into a stream of video and/or audio information which may be stored by the program buffer 204 such that the program content can be streamed out to the media presentation device, such as the television 146, via the presentation device interface 206. Alternatively, or additionally, the parsed out program content may be saved into the DVR 140 for later presentation.

The weather station data processing logic 210 is configured to receive and process weather information received from the customer premises weather station 104. For example, the weather station data processing logic 210 may be configured to compare weather information with corresponding weather condition thresholds 156, generate the reports 150, 152, and/or 154, and correlate weather information with information pertaining to characteristics of the received OTA media content signal 110. The weather station data processing logic 210 may perform other functions, such as managing weather information stored into the weather station database 214 which is archived for later retrieval and/or processing.

The OTA received signal quality logic 212 is configured to monitor and analyze characteristics of the received OTA media content signal 110, such as, but not limited to, signal strength, signal lock, amount of pixelization, or the like. Further, signal quality thresholds 156 may be compared with the received characteristics of the OTA media content signal 110. If a signal quality threshold 156 is violated, then the OTA received signal quality logic 212 may determine that there is signal reception degradation.

The weather station data processing logic 210 and the OTA received signal quality logic 212 may cooperatively operate to correlate weather information with the received characteristics of the OTA media content signal 110. For example, if the weather station data processing logic 210 determines that a level of detected precipitation exceeds a precipitation threshold 156, and concurrently the OTA received signal quality logic 212 determines that signal reception has been degraded, then one or more of the reports 150, 152, and/or 154 may be generated and presented to the customer.

The illustrated embodiment of the media device 106 includes the media content provider interface 208. The media content provider interface 208 is configured to communicatively couple to a communication network 232, which in turn is communicatively coupled to one or more remote facilities, such as, but not limited to, the exemplary media content provider system 216. Other exemplary remote facilities include, but are not limited to, a call center, a service center, an engineering office, a third party facility, or the like.

The communication network 232 may be a very complex communication system. For example, communication network 232 may be the known telephony system that employs both analog and digital forms of communication. Or the communication network 232 may be the Internet. Furthermore, the communication network 232 may be a hybrid system comprised of interacting portions of multiple different types of communication systems. For example, communication network 232 may be a combination of a telephony system and the Internet. Other illustrative communication systems include RF wireless systems, satellite systems and/or cable systems.

Under various conditions, the media device 106 may communicate the weather information detected by the customer premises weather station 104 to the remote facility, such as the exemplary media content provider system 216. Received weather information, along with information identifying the customer, the location of the customer premises 102, the media device 106, and/or the customer premises weather station 104, may be saved into the weather station database 222. Additionally, or alternatively, information pertaining to the operating health of the media device 106 may be communicated to the media content provider system 216. Additionally, or alternatively, information pertaining to the characteristics of the received OTA media content signal 110 may be communicated to the media content provider system 216.

In some instances, a relatively large number of different media devices 106 may concurrently, or over a relatively short duration, report adverse weather conditions and attendant signal reception degradation to the remote facility. If a sufficient number of media devices 106 report signal reception problems, then the signal interference notification system 220 may be used to generate a notification to other customers of potential signal reception problems in their area.

In some instances, the customer may call into the service center, the call center, or the like, to report a problem in their media device 106. A customer service representative may then access information pertaining to weather that is detected by the customer premises weather station 104 and/or other information about the media device 106. Accordingly, the customer and the customer service representative can trouble shoot the problem being reported by the customer. For example, if the problem is weather related, the customer service representative may indicate to the customer that they must wait for the inclement weather to pass. Alternatively, or additionally, the customer service representative may remotely initiate remedial actions to be performed by the media device 106. For example, signal gain parameters may be modified, fade margin parameters may be adjusted, filtering parameters may be modified, orientation of the receiver antenna 142 may be adjusted, and/or other signal processing actions may be implemented to improve signal reception by the media device 106.

In some instances, information received from the media device 106 may be shared with other organizations. For example, weather information may be shared with a local newscaster for inclusion in a weather report broadcast. As another example, the weather information may be shared with a social networking organization. In some applications, the weather information may be provided as a revenue generating service for the media content provider.

The weather information may be shared with other customers in proximity to the customer premises weather station 104. For example, if a plurality of customers in a particular neighborhood are experiencing signal degradation due to local weather conditions, the media service provider may generate and communicate a regional local weather conditions report 150, a regional signal health report 152, and/or a regional advisory report 154 to the other customers in the neighborhood. The shared weather information may be shared by incorporating the weather information into the OTA media content signal 110. Alternatively, or additionally, the weather information may be communicated to the other customers coupled to the communication network 232.

In some embodiments, historical weather information residing in the weather station database 214 is accessible by the customer. The weather information detected by the detectors 112 may be saved over a historical period of interest.

The weather station data processing logic 210 may be configured to generate a variety of reports presenting the historical weather information, such as an hourly report, a daily report, a monthly report, a seasonal report, and/or a yearly report. A historical weather information report spanning any suitable time frame where the weather information is available may be generated by an exemplary embodiment. The historical weather information report may present the weather information in a graphical form, tabular form, or in any suitable format. Further, the weather station data processing logic 210 may be configured to receive customer instructions so that the report is generated in a manner of interest specified by the customer.

In some embodiments, the historical weather information report may be integrated with supplemental information received from other sources or other customer appliances. For example, weather information may be integrated with utility bills, such as electric, gas, water consumption bills. Alternatively, or additionally, the weather information may be integrated with power consumption of an appliance of interest, such as a home air conditioner or heating system. Thus, the customer can relate weather information to their utility bills and/or to appliance power consumption.

In some embodiments, in response to determining that reception of the currently received OTA media content signal 110 has occurred due to inclement weather conditions, the media device 106 reconfigures itself to receive the media content from a different OTA media content signal 110 that has not been degraded by the inclement weather. For example, the exemplary tuner 230 may retune itself to a different available OTA media content signal 110. Alternatively, or additionally, an embodiment may adjust orientation of the receiving antenna 142 to receive the different OTA media content signal 110.

The processor system 114 of the customer premises weather station 104 and/or the processor system 134 of the media device 106 may be configured to process the weather information received from the detectors 112 into a variety of formats that may be used by other applications, programs, or the like. For example, but not limited to, the weather information may be processed into a format that is used by a spread sheet program. As another non-limiting example, the weather information may be processed into a text delimited format. Some embodiments may use these other applications, programs, or the like to separately process and/or analyze the weather information, and/or may use these other applications, programs, or the like to prepare weather information reports that are not presented to the customer. Alternatively, or additionally, these other applications, programs, or the like may be use to generate the reports 150, 152, and/or 154 which are presented to the customer.

It should be emphasized that the above-described embodiments of the customer premises weather monitoring system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for presenting local weather information at a media device located at a customer premises, the method comprising:

detecting an over the air (OTA) media content signal at a receiving antenna;

tuning, at a tuner of the media device, to a media content stream residing in the received OTA media content signal;

communicating the received OTA media content signal from the receiving antenna to the tuner of the media device;

detecting at least one ambient weather condition using a detector located at the customer premises, wherein the detector includes at least one of a thermometer, an anemometer, a wind vane, a rain gauge, a hygrometer, a photometer, and a barometer, and wherein the ambient weather condition is at least one of a temperature detected by the thermometer, a wind speed detected by the anemometer, a wind direction detected by the wind vane, an amount of rain detected by the rain gauge, an amount of humidity detected at the hygrometer, an ambient light intensity detected by the photometer, and an air pressure detected by the barometer;

communicating weather information corresponding to the at least one ambient weather condition from the detector located at the customer premises to the media device;

determining, at the media device, occurrence of a degradation of at least one characteristic of the OTA media content signal received by the receiving antenna located at the customer premises, wherein the occurrence of the degradation of the OTA media content signal characteristic is determined when the OTA media content signal characteristic violates a signal characteristic threshold;

comparing, at the media device, the weather information corresponding to the at least one ambient weather condition with a corresponding weather condition threshold, and generating a report, at the media device, when both the determined degradation of the OTA media content signal characteristic has violated the signal characteristic threshold and the ambient weather condition has exceeded the weather condition threshold, wherein the report is configured to be presented on a display to a customer, and wherein the report indicates the at least one ambient weather condition.

2. The method of claim 1, further comprising:

receiving a customer request for the report; and generating the report in response to the customer request when both the determined degradation of the OTA media content signal characteristic has violated the signal characteristic threshold and the ambient weather condition has exceeded the weather condition threshold.

3. The method of claim 1, wherein the report indicates the at least one ambient weather condition is associated with degradation of the OTA media content signal.

4. The method of claim 1, further comprising:

storing information corresponding to the detected at least one ambient weather condition; and generating a historical weather information report presenting the ambient weather information over a historical period of interest.

5. The method of claim 4, further comprising:

receiving supplemental information corresponding to energy consumption of an appliance over the historical period of interest, wherein the generated report compares the energy consumption of the appliance with the stored ambient weather information.

6. The method of claim 1, further comprising:

communicating information corresponding to the at least one ambient weather condition and the determined degradation of the OTA media content signal characteristic to a remote facility.

7. The method of claim 6, further comprising:

communicating the information corresponding to the at least one ambient weather condition and the determined degradation of the OTA media content signal characteristic from the remote facility to a plurality of other media devices located in proximity to the customer premises.

8. A customer premises weather monitoring system, comprising:

a customer premises weather station located at a customer premises, comprising:

a detector configured to detect an ambient weather condition at the customer premises, wherein the detector includes at least one of a thermometer, an anemometer, a wind vane, a rain gauge, a hygrometer, a photometer, and a barometer, and wherein the ambient weather condition is at least one of a temperature detected by the thermometer, a wind speed detected by the anemometer, a wind direction detected by the wind vane, an amount of rain detected by the rain gauge, an amount of humidity detected at the hygrometer, an ambient light intensity detected by the photometer, and an air pressure detected by the barometer; and a first interface communicatively coupled to the detector and configured to communicate weather information corresponding to the ambient weather condition detected by the detector; and a media device located at the customer premises, comprising:

a second interface configured to communicatively couple to the first interface and configured to receive the weather information communicated from the first interface; and a processor system communicatively coupled to the second interface, and configured to:

determine an occurrence of a degradation of at least one characteristic of an over the air (OTA) media content signal received at the customer premises, wherein the occurrence of the degradation of the OTA media content signal characteristic is determined when the OTA media content signal characteristic violates a signal characteristic threshold;

compare the weather information corresponding to the at least one ambient weather condition with a corresponding weather condition threshold; and generate a report when both the determined degradation of the OTA media content signal characteristic has violated the signal characteristic threshold and the ambient weather condition has exceeded the weather condition threshold, wherein the report indicates at least one of the ambient weather conditions and the degradation of the OTA media content signal.

9. The customer premises weather monitoring system of claim 8, further comprising:

a receiving antenna communicatively coupled to the media device and configured to receive the OTA media content signal.

10. The customer premises weather monitoring system of claim 8, wherein the customer premises weather station further comprises:

a memory medium communicatively coupled to the customer premises weather station processor system, and configured to store the received weather information.

11. The customer premises weather monitoring system of claim 10, wherein the memory medium is further configured to store the weather condition threshold associated with the detected ambient weather condition, and wherein the weather information communicated to the media device in response to the detected weather information violating the weather condition threshold.

12. The customer premises weather monitoring system of claim 10, wherein the weather information is communicated to the media device in response to a customer request received by the media device when both the determined degradation of the OTA media content signal characteristic has violated the signal characteristic threshold and the ambient weather condition has exceeded the weather condition threshold.

13. The customer premises weather monitoring system of claim 8, wherein the media device further comprises:

a memory medium communicatively coupled to the media device processor system, and configured to store the received weather information, wherein the memory medium is further configured to store the weather condition threshold associated with the detected ambient weather condition, and wherein the media device processor system is configured to generate the report in response to the detected weather information violating the weather condition threshold.

14. The customer premises weather monitoring system of claim 13, wherein the media device further comprises:

a third interface communicatively coupled to the media device processor system and configured to communicate the weather information to a remote facility in response to the detected weather information violating the weather condition threshold.

15. A method for monitoring reception of an over the air (OTA) media content signal received by a receiving antenna located at a customer premises, the method comprising:

detecting at least one ambient weather condition using a detector located at the customer premises, wherein the detector includes at least one of a thermometer, an anemometer, a wind vane, a rain gauge, a hygrometer, a photometer, and a barometer, and wherein the ambient weather condition is at least one of a temperature detected by the thermometer, a wind speed detected by the anemometer, a wind direction detected by the wind vane, an amount of rain detected by the rain gauge, an amount of humidity detected at the hygrometer, an ambient light intensity detected by the photometer, and an air pressure detected by the barometer;

communicating weather information corresponding to the detected at least one ambient weather condition from the detector to a media device located at the customer premises;

comparing, at the media device, the weather information corresponding to the detected ambient weather condition with a weather condition threshold associated with the detected ambient weather condition;

detecting the OTA media content signal at the receiving antenna;

communicating the detected OTA media content signal from the receiving antenna to the media device;

determining, at the media device, occurrence of a degradation of at least one characteristic of the OTA media content signal in response to the detected weather information violating a signal characteristic threshold; and generating a report, at the media device, when both the determined degradation of the OTA media content signal characteristic has violated the signal characteristic threshold and the ambient weather condition has violated the weather condition threshold, wherein the report indicates that the determined degradation of the OTA media content signal characteristic is caused by the detected ambient weather condition, and wherein the report is configured to be presented on a display to a customer.

16. The method of claim 15, further comprising:

communicating the detected ambient weather condition to a remote facility in response to the detected weather information violating the weather condition threshold.

* * * * *